(12) United States Patent
Marciniec et al.

(10) Patent No.: US 8,816,117 B2
(45) Date of Patent: Aug. 26, 2014

(54) SYNTHESIS OF FLUOROCARBOFUNCTIONAL SILSESQUIOXANES

(75) Inventors: Bogdan Marciniec, Swarzedz (PL);
Hieronim Maciejewski, Poznan (PL);
Michal Dutkiewicz, Poznan (PL)

(73) Assignee: Adam Mickiewicz University, Poznan (PL)

( * ) Notice: Subject to any disclaimer, the term of this patent is extended or adjusted under 35 U.S.C. 154(b) by 218 days.

(21) Appl. No.: 13/393,380

(22) PCT Filed: Aug. 16, 2010

(86) PCT No.: PCT/PL2010/000073
§ 371 (c)(1),
(2), (4) Date: Feb. 29, 2012

(87) PCT Pub. No.: WO2011/028142
PCT Pub. Date: Mar. 10, 2011

(65) Prior Publication Data
US 2012/0157702 A1    Jun. 21, 2012

(30) Foreign Application Priority Data
Sep. 1, 2009 (PL) ........................... 388931

(51) Int. Cl.
C07F 7/21 (2006.01)
C08G 77/04 (2006.01)
C08G 77/38 (2006.01)

(52) U.S. Cl.
CPC ................... C08G 77/045 (2013.01); C08G 77/38 (2013.01)
USPC ........... 556/479; 556/409; 556/425; 556/446; 556/467

(58) Field of Classification Search
CPC .......... C08G 77/12; C08K 5/5415; C07F 7/21
USPC ........................... 556/409, 425, 446, 467, 479
See application file for complete search history.

(56) References Cited

U.S. PATENT DOCUMENTS

2010/0048932 A1    2/2010 Marciniec et al.

OTHER PUBLICATIONS

Marciniec (referred as Marciniec7); Angewandte Chemie International Edition; 2008, 47, 541-544, published online Dec. 4, 2007.*
Marciniec (referred as Marciniec9); Journal of molecular catalysis A: Chemical; 1999, 144, 263-271.*
International Preliminary Report on Patentability issued in International Application No. PCT/PL2010/000073 on Mar. 6, 2012.
V. I. Lavrent'ev, "Per(γ-trifluoropropyl)octasilsesquioxane," Russian Journal of General Chemistry, vol. 74, No. 8, pp. 1188-1193, 2004.
Kyoungmoo Koh et al., "Precision Synthesis of a Fluorinated Polyhedral Oligomeric Silsesquioxane-Terminated Polymer and Surface Characterization of Its Blend Film with Poly(methyl methacrylate)," Macromolecules, vol. 38, pp. 1264-1270, 2005.
Scott T. Iacono et al., "Facile synthesis of hydrophobic fluoroalkyl functionalized silsesquioxane nanostructures," Chem Commun., pp. 4992-4994, 2007.
Bogdan Marciniec et al., "Modification of (Poly)Siloxanes via Hydrosilylation Catalyzed by Rhodium Complex in Ionic Liquids#," Monatshefte für Chemie, vol. 137, pp. 605-611 (2006).
Brook; "Silicon in Organic;" Organometallic and Polymer Chemistry; 2000; pp. 405 & 409; Wiley, New York.
Braun et al.; "C-F Bond Activation of Highly Fluorinated Molecules at Rhodium: From Model Reactions to Catalysis;" Europ. J. Inorg. Chem.; 2011; pp. 613-625.
Horino et al.; "Alkene and Diene Hydrosilylations, Catalyzed by Lanthanum Tris[bis(trimethylsilyl)amidel];" Organometallics; 2004; pp. 12-14; vol. 23.
Marciniec; Hydrosilylation. A Comprehensive Review on Recent Advances; 2009; p. 7; Springer.
Furukawa et al.; "Synthesis of Fluorosilicone Having Highly Fluorinated Alkyl Side Chains Based on the Hydrosilylation of Fluorinated Olefins with Polyhydromethylsiloxane;" J. Polym. Sci., Part A: Polym. Chem., 2002; pp. 3120-3128; vol. 40.
Marciniec et al.; "Modification of (Poly)Siloxanes via Hydrosilylation Catalyzed by Rhodium Complex in Ionic Liquids;" Monatsch. Chem., 2006; pp. 605-611; vol. 137.

* cited by examiner

Primary Examiner — Sudhakar Katakam
Assistant Examiner — Pancham Bakshi
(74) Attorney, Agent, or Firm — Oliff PLC

(57) ABSTRACT

The subject of the invention is the method of synthesis of fluoracarbofunctional cage silsesquioxanes of the general formula in which•$R^1$ stands for $HCF_2(CF_2)_n(CH_2)mO(CH_2)_3Si(CH_3)_2O$ or $HCF_2(CF_2)_n(CH_2)_mO(CH_2)_3$ group in which n=1-12, m=1-4;•$R^2$, $R^3$, $R^4$, $R^5$, $R^6$, $R^7$, $R^8$ can be the same as $R^1$ or different from it and stand all either for the ($C_1$-$C_{25}$) alkyl group or any aryl group, based on hydrosilylation of fluoroalkyl-allyl ether with an appropriate hydrogen-silsesquioxane in the presence of siloxide rhodium complex [{$Rh(OSiMe_3)(cod)$}$_2$] as a catalyst.

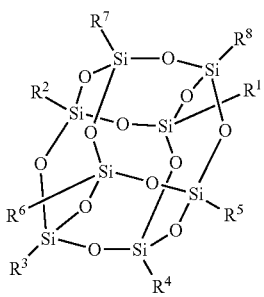

6 Claims, No Drawings

SYNTHESIS OF FLUOROCARBOFUNCTIONAL SILSESQUIOXANES

The subject of invention is the synthesis of fluorocarbofunctional cage silsesquioxanes of the general formula 1,

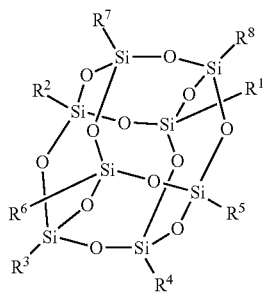

(1)

In which
R$^1$ stands for HCF$_2$(CF$_2$)$_n$(CH$_2$)$_m$O(CH$_2$)$_3$— or HCF$_2$(CF$_2$)$_n$(CH$_2$)$_m$O(CH$_2$)$_3$Si(CH$_3$)$_2$O— groups in which n=1-12, m=1-4;
R$^2$, R$^3$, R$^4$, R$^5$, R$^6$, R$^7$, R$^8$ can be the same as R$^1$ or different from it and stand all either for the alkyl group (C$_1$-C$_{25}$), any aryl group.

Two methods of synthesis of fluorocarbofunctional cage silsesquioxanes have been known hitherto, one based on hydrolytic condensation and the other based on corner-capping.

Lavrent'ev (1) described the synthesis based on hydrolytic condensation of trifluoropropyltrichloro-silane in different solvents in the presence of water. In this method the process of condensation is run in diluted silane solutions (25 ml silane per 1000 ml of solvent), the process takes many days and a mixture of products is obtained from which the cage octamer is isolated and purified. In all processes reported the yield was low; the yield of the process conducted in acetone for 40 days was 10%, in propanol for 65 days—21%, in isobutanol for 100 days—32% and in dioxane for 40 days—22%. Taking into regard very high dilution of silane low yield and long duration of the process the method of hydrolytic condensation is rather ineffective.

Koh et al. (2) described another method based on corner capping of incompletely condensed silsesquioxane. The synthesis is realised in a few stages. The first stage is the reaction of condensation of trifluoropropyltrimethoxysilane in the presence of sodium hydride in the environment of THF, leading to not completely condensed cage of hepta (trifluoropropyl)siloxane trisodium silanol Na$_3$(trifluoropropyl)$_7$Si$_7$O$_{12}$. This compound must be isolated and purified and at the subsequent stage subjected to the corner capping with trifluoropropyltrichlorosilane, in the presence of triethylamine as a catalyst in the environment of THF. The reaction is conducted at room temperature for 20 hours. After this time NaCl obtained as a side product was filtered off and the remaining mixture was subjected to evaporation of solvent. The product, octakis(trifluoro-propyl)octasilsesquioxane obtained with the yield of 66% was subjected to concentration and crystallisation.

A similar method of synthesis of silsesquioxanes with longer fluoroalkyl chains was described by Iacono (3). At the first stage, similarly as in the Koh et al. procedure, Na$_3$(trifluoropropyl)$_7$Si$_7$O$_{12}$ was obtained, which was later subjected to corner capping with the use of CF$_3$(CF$_2$)$_n$CH$_2$CH$_2$SiCl$_3$ (where n=5, 7 and 9), after isolation and purification the final product was obtained in the yield of 71-81%.

The corner capping method is multistage and requires the use of sodium salt Na$_3$(trifluoropropyl)$_7$Si$_7$O$_{12}$, highly sensitive to moisture which means that the process must be conducted in anhydrous conditions and all reagents and solvents must be fully dried.

The subject of invention is a cheap and effective method of synthesis of fluorocarbofunctional silsesquioxanes.

According to the invention, the synthesis of fluorocarbofunctional silsesquioxanes of the general formula 1,

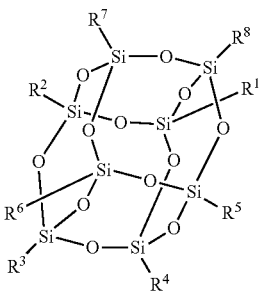

(1)

in which
R$^1$ stands for HCF$_2$(CF$_2$)$_n$(CH$_2$)$_m$O(CH$_2$)$_3$— or HCF$_2$(CF$_2$)$_n$(CH$_2$)$_m$O(CH$_2$)$_3$Si(CH$_3$)$_2$O— groups in which n=1-12, m=1-4;
R$^2$, R$^3$, R$^4$, R$^5$, R$^6$, R$^7$, R$^8$ can be the same as R$^1$ or different from it and stand all either for (C$_1$-C$_{25}$), alkyl group or any aryl group,
is based on hydrosilylation of fluoroalkyl-allyl ether of the general formula 2,

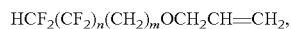

HCF$_2$(CF$_2$)$_n$(CH$_2$)$_m$OCH$_2$CH=CH$_2$, (2)

where n=1-12, m=1-4
with hydrogensilsesquioxane containing at least, one Si—H group, of the general formula 3 in which

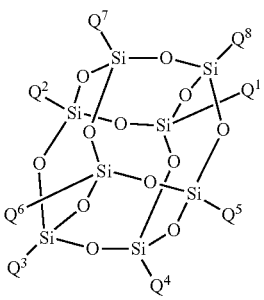

(3)

Q$^1$ stands for H— or HSi(CH$_3$)$_2$O— group,
Q$^2$, Q$^3$, Q$^4$, Q$^5$, Q$^6$, Q$^7$, Q$^8$ can be the same as Q$^1$ or different from it and stand all either for H or (C$_1$-C$_{25}$) alkyl group or any aryl group,
performed in the presence of siloxide rhodium complex [{Rh(OSiMe$_3$)(cod)}$_2$] as a catalyst. The reaction is conducted at a temperature from the 25-80° C. range, till completion of the process, usually for from 0.5 to 4 hours, in the open system, under atmospheric pressure.

The use of fluoroalkyl-allyl ether in excess to the corresponding hydrogensilsesquioxane is recommended but not necessary in order to ensure complete conversion of hydrogensilsesquioxane as its remains weaken the stability of the product. The recommended excess of fluoroalkyl-allyl ether is from 1.1 to 1.4 (the optimum is 1.1) mol of fluoroalkyl-allyl ether per each mol of Si—H groups occurring in hydrogensilsesquioxane.

The catalyst is used in the amount from $10^{-4}$ to $10^{-6}$ mol Rh per 1 mol of Si—H groups occurring in hydrogensilsesquioxane; the optimum is the amount of $5 \times 10^{-5}$ mol.

According to the synthesis invented a proper amount of fluoroalkyl-allyl ether and the catalyst $[\{Rh(OSiMe_3)(cod)\}_2]$ (in the amount corresponding to the concentration of $10^{-4}$ to $10^{-6}$ mol Rh per 1 mol of Si—H groups occurring in hydrogensilsesquioxane) are introduced into the reactor and stirred to get a homogeneous mixture. To this mixture a corresponding hydrogensilsesquioxane is introduced. The content of the reactor is stirred on heating to a temperature from the range 25-80° C. until the reaction completion, which usually takes from 1 to 4 hours. The product can be used directly for many applications; however, when high purity of the product is required, the post-reaction mixture is subjected to evaporation of the small amounts of residual fluoroalkyl-allyl ether.

The application of hydrosilylation in the method of synthesis proposed permitted obtaining fluorocarbofunctional cage silsesquioxanes in high yield and selectivity. The starting product is hydrogensilsesquioxane of well-defined molecular structure whose use eliminates the possibility of getting a mixture of compounds of different size cages or of different topology, which often happens when synthesis is performed by the other known methods. Moreover, the starting materials (hydrogensilsesquioxane and olefins) are not sensitive to moisture and can be manipulated in the air (in contrast to those used in the corner capping method), which significantly simplifies the process of synthesis. Moreover, the use of siloxide rhodium complex as a catalyst permitted reduction of the temperature of the process and significant shortening of its duration, which prevents the occurrence of side reactions (e.g. isomerization of fluoroalkyl-allyl ether), thus improving the yield and selectivity of the process. Rhodium catalysts in contrast to those used hitherto, show higher resistance to poisoning and are less sensitive to the influence of impurities present in the substrates. The rhodium catalysts used permitted running a single-step synthesis of different derivatives of fluoroalkylsilsesquioxane without the necessity of modification of this method for particular groups of the derivatives.

The synthesis proposed is illustrated by the following examples, which do not limit the application of the invention.

EXAMPLE I

The portions of 0.81 g (1 mmol) of hydrogenhepta(isobutyl)octasilsesquioxane and 0.30 g (1.1 mmol) of allyl-octafluoropentyl ether were placed in a flask equipped with a magnetic stirrer and reflux. To this mixture 1.5 μg ($5 \times 10^{-5}$ mol Rh/1 mol Si—H) of siloxide rhodium complex $[\{Rh(OSiMe_3)(cod)\}_2]$ was added. The content was stirred and heated to 80° C. at which it was kept for 2 hours. After this time the excess of allyl-octafluoropentyl ether was evaporated. The reaction gave 1.02 g of hepta(isobutyl)(octafluoropentyloxypropyl)octasilsesquioxane with the yield of 95%. FT-IR analysis confirmed total conversion of Si—H (disappearance of the band at 2180 cm$^{-1}$) and NMR analysis confirmed identity of the product.

$^1$H NMR ($C_6D_6$, 298 K, 300 MHz) δ=0.80-0.87 (m, 16H $SiCH_2$); 1.05-1.12 (m, 42H $CH_3$), 2.03-2.15 (m, 7H CH); 3.31 (t, 2H, $CH_2O$); 3.63 (t, 2H, $OCH_2$); 5.51 (m, 1H, $CF_2H$) ppm.

$^{13}$C NMR ($C_6D_6$, 298 K, 75.5 MHz) δ=12.11 (CH); 20.30 ($SiCH_2$); 21.90 ($CH_2$); 25.83 ($SiCH_2$); 26.41 ($CH_3$); 67.90 ($CH_2O$); 74.72 ($OCH_2$); 105.72 ($CF_2$); 107.88 ($CF_2$); 110.54 ($CF_2H$); 116.15 ($CF_2$) ppm.

$^{29}$Si NMR ($C_6D_6$, 298 K, 59.6 MHz) δ=−66.9; −67.4; −69.6 ($SiCH_2$) ppm.

EXAMPLE II

The portions of 1.02 g (1 mmol) of octakis(hydridodimethyl-siloxy)octasilsesquioxane and 2.4 g (8.8 mmol) of allyl-octafluoropentyl ether were placed in a flask equipped with a magnetic stirrer and reflux. To this mixture 0.12 mg ($5 \times 10^{-5}$ mol Rh/1 mol Si—H) of siloxyl rhodium complex $[\{Rh(OSiMe_3)(cod)\}_2]$ was added. The content was heated to 80° C. and kept at that temperature for 2 hours, upon stirring. After this time the excess of allyl-octafluoropentyl ether was evaporated. The reaction gave 3.07 g of octakis{(octafluoropentyloxypropyl)dimethylsiloxy}octasilsesquioxane with the yield of 96%. FT-IR analysis confirmed total conversion of Si—H (disappearance of the band at 2180 cm$^{-1}$) and NMR analysis confirmed identity of the product.

$^1$H NMR ($C_6D_6$, 298 K, 300 MHz) δ=0.22 (s, 48H, $Si(CH_3)_2$); 0.60 (t, 16H, $SiCH_2$); 1.59 (qui, 16H, $CH_2$); 3.25 (t, 16H, $CH_2O$); 3.60 (t, 16H, $OCH_2$); 5.43 (m, 8H, $CF_2H$) ppm.

$^{13}$C NMR ($C_6D_6$, 298 K, 75.5 MHz) δ=−0.58 ($Si(CH_3)_2$); 13.60 ($SiCH_2$); 23.30 ($CH_3$); 67.60 ($CH_2O$); 75.49 ($OCH_2$); 105.66 ($CF_2$); 108.18 ($CF_2$); 110.71 ($CF_2H$); 116.06 ($CF_2$) ppm.

$^{29}$Si NMR ($C_6D_6$, 298 K, 59.6 MHz) δ=13.39 ($Si(CH_3)_2$); −108.48 (SiOSi) ppm.

LIST OF REFERENCES

1. V. I. Lavrent'ev, Russ. J. Gen. Chem., 74 (2004), 1188
2. K. Koh, S. Sugiyama, T. Morinaga, K. Ohno, Y. Tsuji, T. Fukinada, M. Yamahiro, T. Iijima, H. Oikawa, K. Watanabe, T. Miyashita, Macromolecules, 38, (2005), 1264)
3. S. T. Iacono, A. Vij, W. W. Grabow. D. W. Smith, Jr., J. M. Mabry, Chem. Commun. 2007, 4992).

The invention claimed is:
1. A method of synthesis of fluorocarbofunctional cage silsesquioxanes of the general formula 1,

(1)

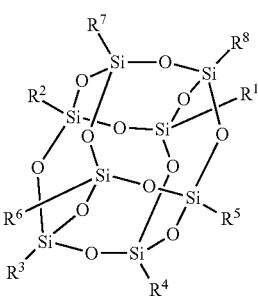

wherein
R$^1$ is $HCF_2(CF_2)_n(CH_2)_mO(CH_2)_3$ or $HCF_2(CR_2)_n(CH_2)_mO(CH_2)_3Si(CH_3)_2O$, wherein n=1-12 and m=1-4;
R$^2$, R$^3$, R$^4$, R$^5$, R$^6$, R$^7$, R$^8$ are each selected from the group consisting of R$^1$, a ($C_1$-$C_{25}$) alkyl group and any aryl group, the method comprising a reaction of hydrosilylation of a fluoroalkyl-allyl ether of the general formula 2,

  (2)

wherein n=1-12 and m=1-4,
with a hydrosilsesquioxane containing at least one Si—H group of the general formula 3,

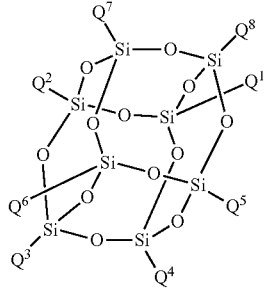  (3)

wherein
Q$^1$ stands for H— or HSi(CH$_3$)$_2$O—, and
Q$^2$, Q$^3$, Q$^4$, Q$^5$, Q$^6$, Q$^7$, Q$^8$ are each selected from the group consisting of Q$^1$, a (C$_1$-C$_{25}$) alkyl group and any aryl group,
in the presence of a siloxide rhodium complex [{Rh(OSiMe$_3$)(cyclooctadiene)}$_2$] as a catalyst.

2. The method of claim 1, wherein the catalyst is used in an amount that ranges from 10$^{-4}$ to 10$^{-6}$ mol Rh per 1 mol silane.

3. The method of claim 2, wherein the catalyst is used in the amount of 5×10$^{-5}$ mol Rh per 1 mol silane.

4. The method of claim 1, wherein the hydrosilylation reaction is conducted at a temperature of from 25-80° C.

5. The method of claim 4, wherein the hydrosilylation reaction is conducted for from 0.5 to 4 hours under atmospheric pressure.

6. The method of claim 1, wherein in a reaction mixture, from 1.1 to 1.4 mol of the fluoroalkyl-allyl ether is present per each mol of Si—H groups in the hydrosilsesquioxane.

* * * * *